United States Patent [19]

Hsieh

[11] Patent Number: 5,203,252

[45] Date of Patent: Apr. 20, 1993

[54] TOASTER WITH MULTI-FUNCTION

[76] Inventor: Tung-Chiang Hsieh, #6, Lane 210, Chung Cheng S. Rd., Yung Kang Hsiang, Tainan Hsien, Taiwan

[21] Appl. No.: 950,714

[22] Filed: Sep. 25, 1992

[51] Int. Cl.⁵ .................. A47J 29/00; A47J 29/02
[52] U.S. Cl. ........................ 99/339; 99/340; 99/357; 99/440; 99/448; 219/438; 219/472; 219/521
[58] Field of Search ............... 99/330, 331, 336, 346, 99/339, 340, 341, 352, 355, 357, 422, 440, 441, 442, 448, 449, 393, 385, 401; 219/472, 438, 521, 533, 537

[56] References Cited

U.S. PATENT DOCUMENTS

| | | | |
|---|---|---|---|
| 1,767,802 | 6/1930 | Langos | 99/440 |
| 2,334,122 | 11/1943 | Payne | 99/357 |
| 2,419,674 | 4/1947 | Caplan | 99/339 |
| 2,429,736 | 10/1947 | Wales | 99/339 |
| 2,761,375 | 9/1956 | Jepson | 99/448 |
| 2,790,378 | 4/1957 | Zander | 99/336 |
| 3,020,824 | 2/1962 | Pantermoller | 99/440 |
| 3,396,655 | 8/1968 | Yoshida et al. | 99/440 |
| 3,577,908 | 5/1971 | Burg | 99/340 |
| 3,720,156 | 3/1973 | Hentschel et al. | 99/352 |
| 4,889,972 | 12/1989 | Chang | 219/472 |

FOREIGN PATENT DOCUMENTS

| | | | |
|---|---|---|---|
| 2631765 | 1/1978 | Fed. Rep. of Germany | 99/440 |
| 2818593 | 10/1979 | Fed. Rep. of Germany | 99/340 |
| 3442290 | 5/1986 | Fed. Rep. of Germany | 99/336 |

Primary Examiner—Timothy F. Simone
Attorney, Agent, or Firm—Morton J. Rosenberg; David I. Klein

[57] ABSTRACT

A toaster with multi-function has a heating plate including two recess one of which is sized to receive a coffee cup thereon to warm up while the other recess is sized to receive an egg broiler which has a plurality of holes adapted two receive eggs thereon, a plurality of stands to support the broiler to stand on the recess, and a handle extending upwardly from the center portion thereof. A steam pot being formed by two half-rounded plates for frying egg each having a recess at center portion therreof adapted to receive an egg yellow while the flat portion surrounding the recess is adapted to receive egg white. A cap of a dome shape being sized to cover the egg broiler and the steam pot therein.

1 Claim, 3 Drawing Sheets

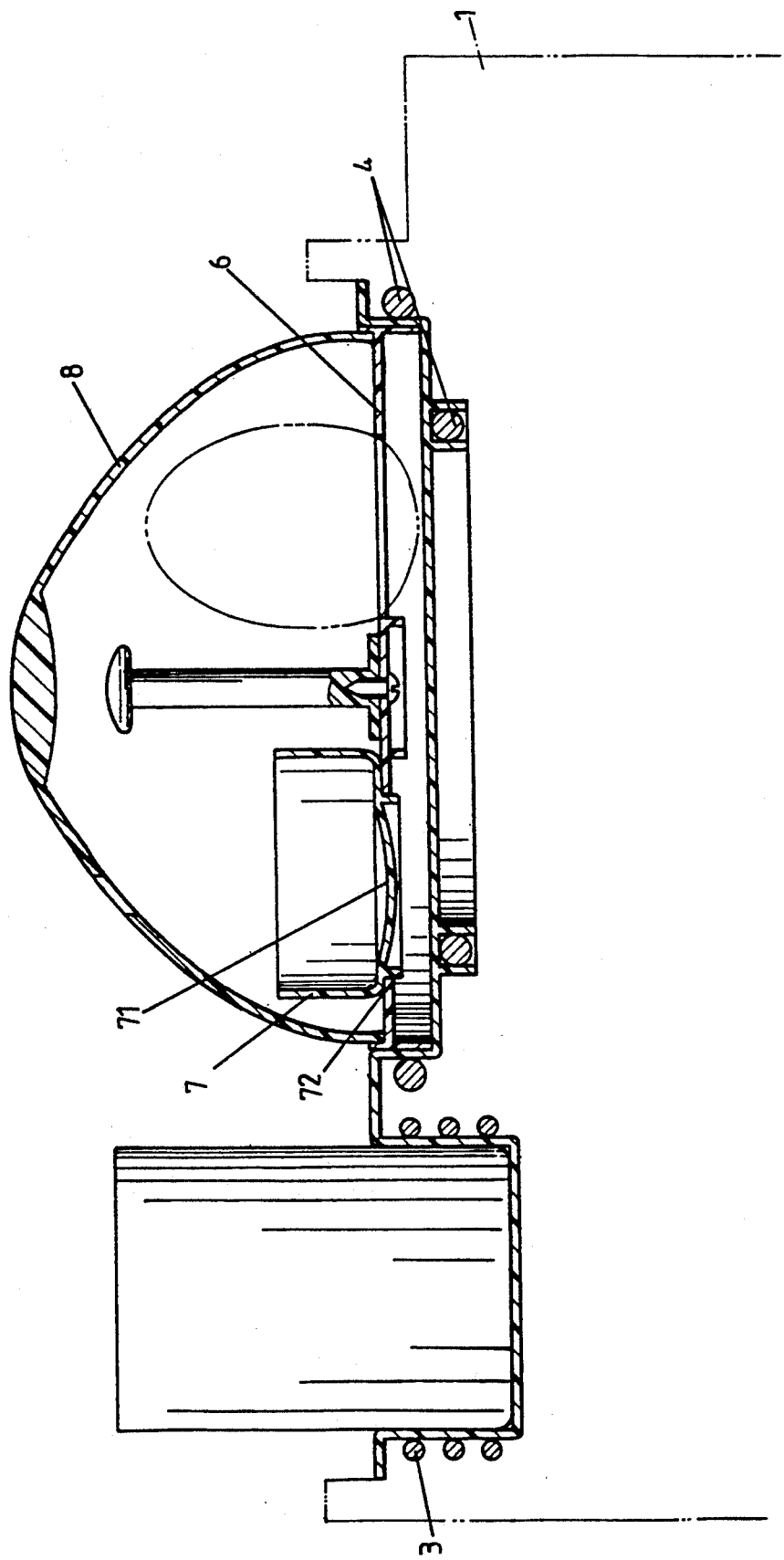

TOASTER WITH MULTI-FUNCTION

FIELD OF THE INVENTION

This invention relates to a toaster. More particularly, a toaster enables to fry, to broil or to steam eggs while toasting breads.

RELATED PRIOR ART

Toasters are one of the appliances that each family owns for the purpose of its convenience. Most toasters have only monofunction that is to toast bread. A multi-function toaster was, therefore, developed and applied for U.S. patent with Ser. No. 07/580,340, now abandoned that is to toast a bread and to warm a cup of coffee at the same time. However, this invention still has some shortcomings.

It is, therefore, an object of the inventor to invent the present invention.

SUMMARY OF THE INVENTION

It is the primary object of the present invention to provide a toaster with multi-function which possesses multi-function which can toast breads, warm a cup of coffee, broil eggs and fry an egg at the same time.

It is another object of the present invention to provide a toaster with multi-function which saves energy.

It is still another object of the present invention to provide a toaster with multi-function which is easy to operate.

It is a further object of the present invention to provide a toaster with multi-function which is inexpensive to produce.

BRIEF DESCRIPTION OF THE DRAWINGS

FIG. 3 is a side elevational view of the present invention, partially sectioned.

DETAILED DESCRIPTION OF THE PREFERRED EMBODIMENT

Figure 1:
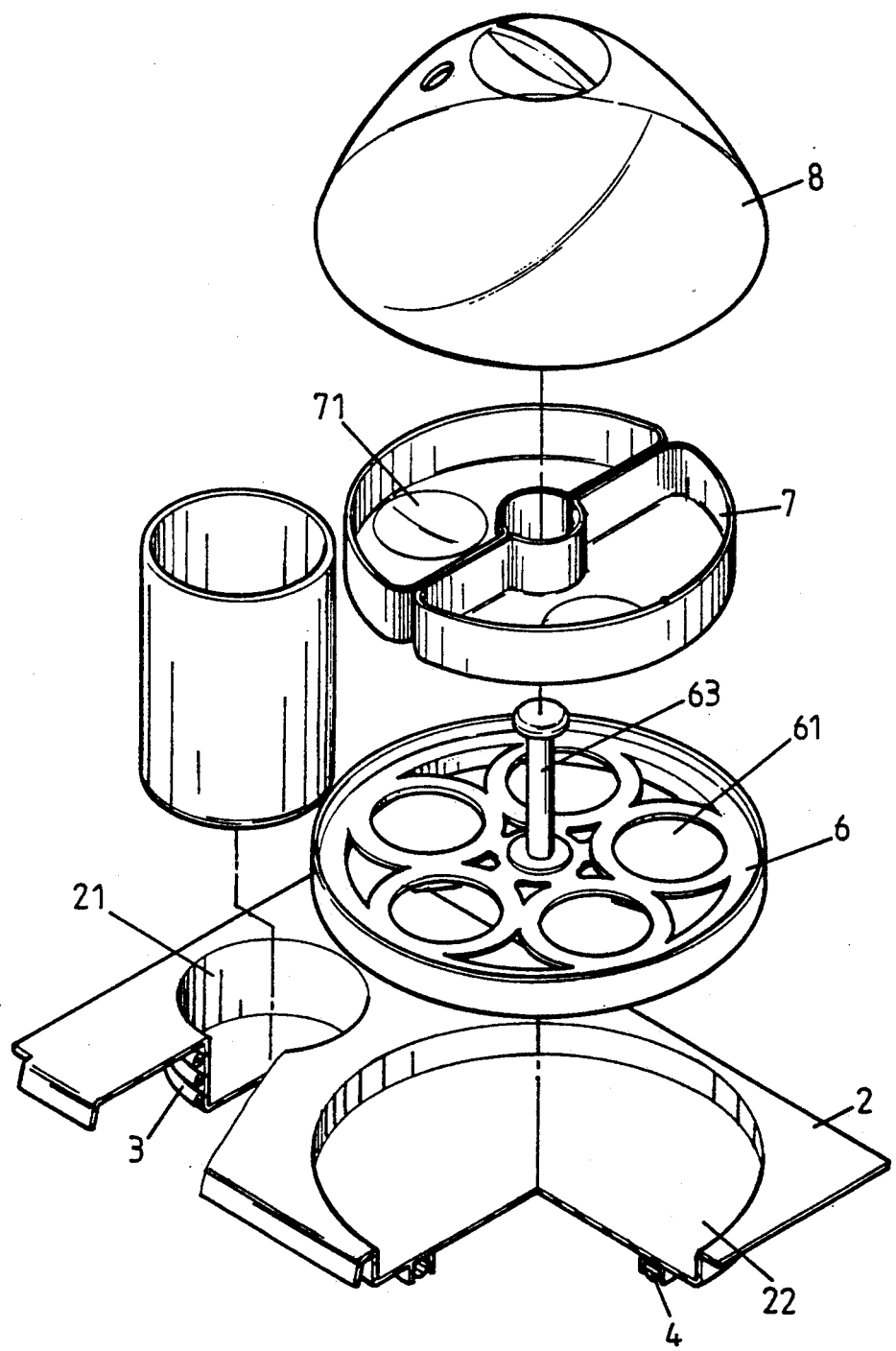
FIG. 1 is an exploded view of the present invention.
Figure 2:
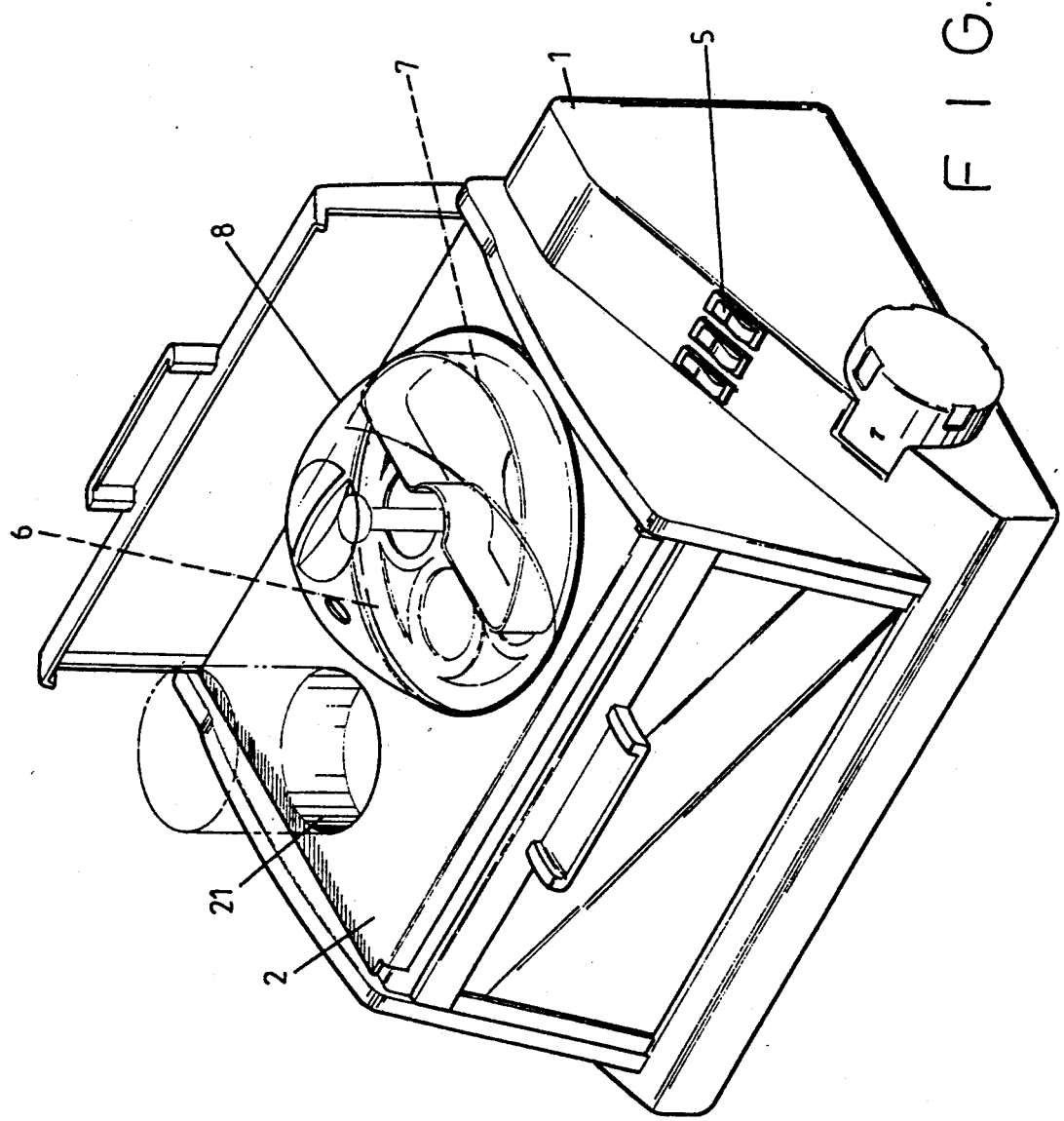
FIG. 2 is a perspective view of the present invention being installed in a toaster.

Reference is now made to the drawings wherein each drawing is for the purpose of illustrating and not for the purpose of limiting the same, FIGS. 1, 2 and 3 show the present invention is essentially composed of a casing 1, a heat plate 2, two electric cords 3 and 4, a set of switch 5, an egg broiler 6, a steam pot 7, and a cap 8.

The casing 1 is formed like an ordinary one having toasting room at inner center portion, a tray at bottom portion adapted to collect all residues, and a plurality of switches 5 secured thereon adapted to control each function individually.

The heat plate 2 on top of the casing 1 has two recesses 21 and 22. The recess 21 has a diameter sized to receive a coffee cup therein, and the recess 22 has a diameter sized to receive the egg broiler 6 therein. Underneath the two recesses 21 and 22, electric cords 3 and 4 are affixed as heating elements.

The egg broiler 6 is a round shape having a plurality of holes 61 surrounding inner periphery adapted to support eggs to stand thereat, a plurality of stands at bottom portion facing downwardly adapted to support the egg broiler 6 to stand on the recess 22, and a handle 63 extending upwardly from the center portion of the broiler 6 adapted for easy handling by hand.

The steam pot 7 includes two half-rounded sections each section has a recess 71 at center portion thereof adapted to receive egg yellow whereas the flat area of the half rounded section is adapted to receive egg white for frying. A protuberance 72 is formed at opposite end of the recess and has a diameter sized smaller than the diameter of each of the holes 61 adapted for seating on the hole 61.

The cap 8 has a dome shaped body with a diameter of its open end slightly larger than the diameter of the steam pot 7 but smaller than the diameter of the recess 22 so that cap is support on the periphery of the recess 22 while steam pot 7 is closed therein.

When broiling eggs, simply place eggs on the holes 61, cover the cap 8 and turn the switch 5 on. When it is desired to broil and fry eggs at same time, place eggs on the holes 61 and put the steam pot 7 on top of the egg broiler 6 with the protuberance 72 seating on one of the holes 61 for frying purpose. When it is desired to warm a cup of coffee or tea, simply place the cup on the recess 21.

I claim:

1. A toaster with multi-function having a casing of a general outline comprising a heat plate at top portion, two cords surrounding said heating plate, a set of switches adapted to control each function, an egg broiler seated on top of said heating plate, a steam pot resting on top of said egg broiler and a cap and characterized in that said heating plate having two recesses each being surrounded by one of said cords and one of which being sized to receive a cup therein while the other recess being sized to receive said egg broiler therein;

said egg broiler being integrally formed having a plurality of holes adapted to receive an egg thereon, a plurality of stands at bottom portion adapted to support said egg broiler to stand on said recess, and a handle extending from the center portion thereof;

said steam pot including two half-rounded plates each having a recess at center portion adapted to receive an egg yellow while the flat portion surrounding hereat being to receive egg white, and a protuberance at opposite site of said recess adapted to be inserted into one of said holes of said egg broiler;

said cap having a dome shaped body with the diameter of the open end slightly larger than the diameter of said steam pot and smaller than the diameter of said recess of said heating plate.

* * * * *